United States Patent
Honda

(10) Patent No.: US 10,328,650 B2
(45) Date of Patent: Jun. 25, 2019

(54) TIRE VULCANIZATION BLADDER, MANUFACTURING METHOD THEREOF AND RUBBER COMPOSITION FOR BLADDER

(71) Applicant: SUMITOMO RUBBER INDUSTRIES, LTD., Kobe-shi, Hyogo (JP)

(72) Inventor: Shinichiro Honda, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 0 days.

(21) Appl. No.: 15/923,267

(22) Filed: Mar. 16, 2018

(65) Prior Publication Data
US 2018/0272638 A1    Sep. 27, 2018

(30) Foreign Application Priority Data

Mar. 23, 2017  (JP) .................... 2017-057271

(51) Int. Cl.
| | | |
|---|---|---|
| *B29D 30/06* | (2006.01) | |
| *C08L 9/06* | (2006.01) | |
| *C08L 9/00* | (2006.01) | |

(52) U.S. Cl.
CPC ............ *B29D 30/0654* (2013.01); *C08L 9/00* (2013.01); *B29D 2030/0655* (2013.01); *B29K 2809/06* (2013.01); *B29K 2995/0013* (2013.01); *B29K 2995/0088* (2013.01); *B29K 2995/0097* (2013.01); *C08L 9/06* (2013.01); *C08L 2205/03* (2013.01)

(58) Field of Classification Search
CPC ........ B29D 30/0654; B29D 2030/0655; C08L 9/00; C08L 9/06; C08L 2809/06; B29K 2809/06; B29K 2995/0088; B29K 2995/0097
USPC .................................................... 425/43, 52
See application file for complete search history.

(56) References Cited

U.S. PATENT DOCUMENTS

| | | | | |
|---|---|---|---|---|
| 5,256,350 A | * | 10/1993 | Franzini ................. | B29C 45/02 264/102 |
| 5,385,459 A | * | 1/1995 | Graves ................. | B29C 33/505 264/315 |
| 6,846,444 B2 | * | 1/2005 | Beers ................. | B29D 30/0654 264/315 |
| 6,998,088 B2 | * | 2/2006 | Beers ................. | B29C 37/0067 264/315 |
| 2009/0081323 A1 | * | 3/2009 | Yano ................. | B29D 30/0654 425/52 |
| 2011/0262573 A1 | * | 10/2011 | Tanno ..................... | B29C 33/64 425/52 |

FOREIGN PATENT DOCUMENTS

| | | | |
|---|---|---|---|
| JP | 4863392 B2 | | 1/2012 |
| JP | 6632790 B2 | | 1/2012 |
| JP | 2017-48295 | * | 3/2017 |
| WO | WO 2015/080375 | * | 6/2015 |

* cited by examiner

*Primary Examiner* — James P Mackey
(74) *Attorney, Agent, or Firm* — Birch, Stewart, Kolasch & Birch LLP

(57) ABSTRACT

A rubber composition for a bladder used for manufacturing a bladder for vulcanizing tire, in which 1 to 5 parts by mass of a polymer having a weight average molecular weight Mw of 1,000,000 or more is blended in 100 parts by mass of a rubber component containing butyl rubber as a main component, and a method for manufacturing a bladder for vulcanization of tires characterized in that the bladder for vulcanization of tires is manufactured by an extrusion molding and an injection molding of a rubber composition for a bladder, in the rubber composition for a bladder, 1 to 5 parts by mass of a polymer having a weight average molecular weight Mw of 1,000,000 or more is blended with 100 parts by mass of a rubber component containing butyl rubber as a main component, and the injection molding of the rubber composition for a bladder is carried out while performing vacuum suction.

6 Claims, No Drawings

TIRE VULCANIZATION BLADDER, MANUFACTURING METHOD THEREOF AND RUBBER COMPOSITION FOR BLADDER

TECHNICAL FIELD

This invention relates to a bladder for vulcanizing tire used in a vulcanizing tire process of a pneumatic tire, a manufacturing method thereof, and a rubber composition for a bladder which can be used for manufacturing the above bladder for vulcanizing tire.

BACKGROUND ART

Generally, production of a pneumatic tire is carried out by setting a molded green tire in a tire vulcanizer and applying heat and pressure from both the inside and the outside of the green tire to vulcanize it.

Specifically, while heating and pressurizing the green tire from the outside with a vulcanization mold, a bladder for vulcanizing tire (hereinafter simply referred to as "bladder") disposed in the lumen portion of the green tire is expanded by supplying a heating and pressing medium for heating and pressing the raw tire from the inside (Patent Document 1).

If a void such as air remains in the bladder and the bladder is used repeatedly with expansion and contraction, it may cause breakage and cracks due to fatigue and it may puncture and shorten the life (bladder life).

Therefore, at the time of manufacturing the bladder, when the kneaded rubber composition for a bladder (hereinafter also simply referred to as "rubber composition") is extruded, for removing voids inside the resultant rubber member caused by the air entrainment at the time of introduction or the volatile component the rubber member, extrusion molding is carried out while sucking a gas component by vacuum during the extrusion operation (Patent Document 2). Thereby, it is possible to manufacture a bladder by molding homogeneous rubber without porous.

PRIOR ART DOCUMENTS

Patent Documents

[Patent document 1] JP5632790B
[Patent document 2] JP4863392B

SUMMARY OF THE INVENTION

Problem to be Solved by the Invention

However, since the bladder has a special balloon-like rubber shape, it is manufactured by extrusion molding and then injection molding. In the injection molding, if foaming due to a component volatilized by a new processing load can not be suppressed, the voids cannot be removed from the final product completely and consequent performance deterioration is inevitable.

That is, upon injection molding, since a high-temperature, high-speed deformation load is applied to the rubber composition, volatile components such as moisture and reaction decomposition may foam due to shear/heat history. In a bladder having voids formed by the foaming, fatigue cracks due to the voids develop as a result of use, causing destruction and cracking, and a long bladder life can not be obtained.

In addition, since the bladder needs to efficiently transmit the heat of the supplied pressurized medium to the raw tire, it is required that the bladder have high thermal conductivity. Therefore, it is conceivable to fill the rubber composition with filler having high thermal conductivity, but it is not easy to procure fillers with high thermal conductivity at low cost.

In view of the above, an object of the present invention is to provide a bladder manufacturing technique at a low cost which is capable of manufacturing a bladder which does not generate voids or the like during injection molding, thus enabling a long bladder life, and has sufficiently high thermal conductivity.

Means for Solving the Problem

The inventors of the present invention have conducted intensive studies and have found that the above-mentioned problems can be solved by the inventions described below, and have completed the present invention.

The invention according to a first embodiment is a rubber composition for a bladder used for manufacturing a bladder for vulcanizing tire, in which 1 to 5 parts by mass of a polymer having a weight average molecular weight Mw of 1,000,000 or more is blended in 100 parts by mass of a rubber component containing butyl rubber as a main component.

The invention according to a second embodiment is the rubber composition for a bladder according to the first embodiment, in which the polymer is a high-styrene type styrene-butadiene rubber.

The invention according to a third embodiment is a method for manufacturing a bladder for vulcanization of tires characterized in that, the bladder for vulcanization of tires is manufactured by an extrusion molding and an injection molding of a rubber composition for a bladder, in the rubber composition for a bladder, 1 to 5 parts by mass of a polymer having a weight average molecular weight Mw of 1,000,000 or more is blended with 100 parts by mass of a rubber component containing butyl rubber as a main component, and the injection molding of the rubber composition for a bladder is carried out while performing vacuum suction.

The invention according to a fourth embodiment is a tire vulcanizing bladder used for vulcanization molding of a pneumatic tire, in which 1 to 5 parts by mass of a polymer having a weight average molecular weight Mw of 1,000,000 or more is blended in 100 parts by mass of a rubber component containing butyl rubber as a main component, and of which the thermal conductivity is 0.38 or more.

The invention according to a fifth embodiment is the tire vulcanizing bladder according to the fourth embodiment, in which the thickness is 5 to 15 mm.

Effect of the Invention

According to the present invention, a bladder manufacturing technique can be provided at low cost which is capable of manufacturing a bladder which does not generate voids or the like during injection molding, thus enabling a long bladder life, and has sufficiently high thermal conductivity.

EMBODIMENTS FOR CARRYING OUT THE INVENTION

[1] About the Present Invention

The present inventors have conducted various experiments and studies on solving the above-described problems. As a result, it was found that when a small amount of the ultrahigh molecular weight component was added to the rubber component, the occurrence of porosity was suppressed.

Specifically, with the addition of a small amount of the ultra-high molecular weight component, the macroscopic flow of filling inside the mold by injection molding becomes smooth, while at the same time the micro high speed deformation due to expansion of volatile components such as porous generation is suppressed, and final bladder life performance and the like is equivalent. Thus, a balanced rubber composition was found.

As an estimated mechanism, it can be considered that it is due to strain hardening imparting property by adding ultra-high molecular weight component to the rubber composition and the rate dependency control. That is, since the occurrence of this strain hardening is caused by entanglement of rubber molecular chains, it has rate dependence. At this time, the flow velocity during macroscopic injection molding is not fast enough to develop strain hardening. However, since the expansion rate at the time of foaming is fast and the deformation mode is an elongation mode necessary for expressing the strain hardening property, strain hardening occurs only on this deformation. Therefore, if molding is carried out while suppressing foaming in injection molding, the final physical property performance and fluidity in injection molding are secured. Then, as a result, a mechanism which provides a bladder without a porous can be presumed.

If the bladder has no porosity in this manner, fatigue cracks due to voids will not develop and destruction and cracking will not occur, as well as heat conduction loss due to the voids will not occur, so that heat conduction in the bladder can be improved more than in conventional bladders.

As a result, in the case of using the bladder according to the present invention, it is possible to shorten the vulcanization time by an improved thermal conductivity and to improve the bladder life by sufficiently suppressing the fatigue crack propagation property due to the void.

[2] Embodiment of the Present Invention

Hereinafter, the present invention described above will be specifically described based on embodiments of the present invention.
1. Materials Used in the Present Embodiment The rubber composition for bladders used in the present embodiment can be obtained by properly blending the following materials and kneading.
(1) Rubber Component In the present embodiment, butyl rubber (IIR) is used as a main component of the rubber component from the viewpoint that its gas impermeability is excellent and hardening by continuous heating is small.

The butyl rubber is not particularly limited, and it is also possible to use halogenated butyl rubber (X-IIR) such as brominated butyl rubber (Br-IIR) and chlorinated butyl rubber (Cl-IIR) in addition to unmodified butyl rubber (IIR). These butyl rubbers may be used alone, or two or more of them may be used in combination.

The blending amount of the butyl rubber in 100 parts by mass of the rubber component is preferably 90 to 99 parts by mass, and more preferably 93 to 97 parts by mass. If the amount is less than 90 parts by mass, the heat resistance may be lowered. On the other hand, if the amount exceeds 99 parts by mass, the amount of rubber other than the butyl rubber may become insufficient so that the rubber becomes soft and there is a possibility that the necessary rigidity as a bladder cannot be maintained.

Further, from the viewpoint of obtaining good heat resistance and rigidity and prolonging the life of the bladder, it is preferable to use chloroprene rubber (CR) in addition to the butyl rubber.

The amount of CR in 100 parts by mass of the rubber component is preferably 1 to 10 parts by mass, and more preferably 3 to 7 parts by mass. When the amount exceeds 10 parts by mass, the content of the butyl rubber decreases, and there is a possibility that sufficient heat resistance cannot be obtained.

In the present embodiment, in addition to these rubbers, a polymer having a weight average molecular weight Mw of 1,000,000 or more is blended as an ultrahigh molecular weight component with the rubber component.

By blending such an ultrahigh molecular weight component, as described above, while the final physical property performance and fluidity in injection molding are secured at the time of injection molding, strain hardening can be developed to suppress foaming at the time of high-speed elongation deformation, where the volatile component pushes out rubber at a micro scale during injection molding, so that fatigue crack propagation due to voids is sufficiently suppressed. As a result, bladder life is improved as well as thermal conductivity is improved and a bladder capable of shorten the vulcanization time can be provided.

The ultrahigh molecular weight component having a weight average molecular weight Mw of 1,000,000 or more is not particularly limited, but high styrene type unmodified styrene butadiene rubber (SBR) or the like can be preferably used, for example.

Compounding amount of the ultrahigh molecular weight component is preferably 1 to 5 parts by mass to 100 parts by mass of the rubber component. If it is less than 1 part by mass, strain hardening is not sufficiently exhibited, and there is a possibility that the porosity still remains. On the other hand, if it exceeds 5 parts by mass, macroscopic flow of the rubber at the time of injection molding worsens and there is a possibility of causing defects on the rubber surface, though the strain hardening is sufficiently exhibited and the porosity is suppressed.
(2) Carbon Black Carbon black is compounded in the rubber composition according to this embodiment. As a result, performance such as breaking strength (rubber strength) is improved and durability is improved.

The carbon black is not particularly limited, and known carbon black blended in a vulcanized rubber composition can be used. Specifically, SAF, ISAF, HAF, FF, FEF, GPF, T-NS and the like commonly used in the tire industry can be mentioned. It is also preferable to use acetylene black which is excellent not only in reinforcing property but also in thermal conductivity. These carbon blacks may be used alone, or two or more of them may be used in combination.

It is preferable that the carbon black is previously dehydrated so that the water content is 0.5 mass % or less. This effectively suppresses an increase in moisture content in the rubber composition and effectively suppresses formation of voids due to vaporization of moisture. As a specific dehydration method, for example, means for heating in an oven at 120° C. or higher for 2 days or more, means for drying in a vacuum oven, and the like can be mentioned. The moisture content of the carbon black can be measured by heating loss according to JIS K6218.

The nitrogen adsorption specific surface area ($N_2$ SA) of the carbon black is preferably 90 to 140 m$^2$/g, more preferably 105 to 125 m$^2$/g. If it is less than 90 m$^2$/g, the reinforcing power is not sufficiently exhibited and there is a possibility that the bladder life is deteriorated. On the other hand, when it exceeds 140 m$^2$/g, the bladder tends to become hard. Note that $N_2$ SA can be obtained by method A in JIS K 6217.

The dibutyl phthalate oil absorption (DBP) of the carbon black is preferably 70 to 150 ml/100 g, more preferably 90 to 130 ml/100 g. If it is less than 70 ml/100 g, sufficient reinforcement may not be obtained. On the other hand, when it exceeds 150 ml/100 g, fatigue resistance characteristics such as elongation at break may be deteriorated. Note that the DBP can be obtained by the measurement method in JIS K 6217-4.

In the present embodiment, the blending amount of carbon black is preferably 20 to 100 parts by mass, more preferably 45 to 75 parts by mass with respect to 100 parts by mass of the rubber component. If it is less than 20 parts by mass or more than 100 parts by mass, the product may not be suitable for use as a bladder.

(3) Phenolic Resin

In the present embodiment, it is preferable to incorporate a phenolic resin. As a result, the hardness of the bladder can be increased. This phenolic resin also functions as a vulcanizing agent.

Examples of the phenolic resin include phenol formaldehyde resin, phenol furfural resin, resorcin formaldehyde resin and the like, which may be modified. Among them, a phenol formaldehyde resin is preferable, and an alkyl-modified alkylphenol formaldehyde resin is more preferable. Among them, a resin represented by the following formula is particularly preferable.

[Chemical formula 1]

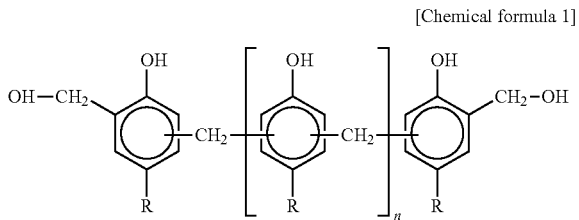

(In the formula, R represents an alkyl group having 1 to 20 carbon atoms, and n represents an integer of 0 to 10.)

Examples of the alkyl group having 1 to 20 carbon atoms (preferably 2 to 14 carbon atoms, more preferably 6 to 10 carbon atoms) represented by R include a methyl group, an ethyl group, an n-propyl group, an isopropyl group, an n-butyl group, an iso-butyl group, a sec-butyl group, a tert-butyl group, a pentyl group, a hexyl group, a heptyl group, a 2-ethylhexyl group, an octyl group, a nonyl group and a decyl group.

In the above formula, n is an integer of 0 to 10 (preferably 0 to 6, more preferably 0 to 4).

Blending amount of the phenolic resin is preferably 1 to 12 parts by mass, more preferably 3 to 9 parts by mass, based on 100 parts by mass of the rubber component from the viewpoint of adequate vulcanization rate and sufficient increase in the hardness.

(4) Other Compounding Materials

In the present embodiment, in addition to each of the above-mentioned blending materials, it is possible to appropriately blend a plasticizer such as zinc oxide, stearic acid, oil and the like, an inorganic filler such as silica, calcium carbonate, talc and the like, various aging inhibitors, and the like. Of these, zinc oxide is preferable because it can effectively promote the vulcanization reaction of the unvulcanized rubber composition.

Powdered material, among these blended materials, is preferably dehydrated beforehand as in the case of the carbon black.

2. Manufacture of Bladder

The bladder according to this embodiment can be manufactured through the following steps.

(1) Production of Rubber Composition for a Bladder

The rubber composition for a bladder according to the present embodiment can be produced by a known method.

Specifically, the rubber composition for a bladder according to the present embodiment can be produced by charging all blended materials into an internal mixer such as a Banbury mixer, a kneader or the like, followed by kneading them.

(2) Extrusion Molding of Rubber Composition

Next, the obtained rubber composition is formed into a predetermined shape such as a band shape by extrusion molding using an extruder. At this time, extrusion molding is performed while sucking the gas component by vacuum. As a result, it is possible to remove the voids in the rubber member caused by the entrainment of air at the time of charging the rubber composition and the volatile components in the extruder.

(3) Injection Molding of Rubber Composition

Next, the extruded rubber composition is injection molded toward the bladder mold while being sucked by a vacuum to obtain a vulcanized bladder.

At this time, strain hardening due to the ultrahigh molecular weight component compounded in the rubber composition is developed, and occurrence of foaming can be sufficiently suppressed. As a result, it is possible to obtain a bladder having no voids, and not only the fatigue crack propagation property due to the voids is sufficiently suppressed, thereby the bladder life can be improved, but also heat conduction loss by the void is eliminated so that a bladder capable of shorten the vulcanization time can be provided.

The vulcanization condition of the injection molded rubber composition is usually set at 190° C. for about 25 to 35 minutes, more preferably about 28 to 20 minutes.

3. Tire Vulcanization Bladder

In the present embodiment, the thickness of the bladder is preferably 5 to 15 mm, more preferably 6 to 10 mm. If it is less than 5 mm, the lifetime of the bladder may be shortened. On the other hand, when it exceeds 15 mm, there is a possibility that cost increases and deterioration of vulcanization efficiency is caused. The thickness of the bladder herein can be calculated by measuring the thickness of a portion in contact with the inner liner under the crown portion (central portion) of the tread at the time of vulcanization.

Even in the case where the bladder according to the present embodiment is repeatedly used for vulcanization molding of a tire at 130 to 220° C. for 5 to 120 minutes (preferably at 150 to 190° C. for 5 to 90 minutes), the bladder has excellent bladder life. Particularly, at vulcanization conditions of 140 to 200° C. for 5 to 35 minutes (preferably 150 to 185° C. for 7 to 25 minutes) for vulcanization molding of passenger car tires as well as at vulcanization conditions of 135 to 185° C. for 10 to 50 minutes (preferably at 140 to 175° C. for 12 to 40 minutes) for vulcanization molding of truck and bus tires, the bladder for vulcanization can be suitably used.

As described above, according to the present embodiment, it is possible not only to improve the bladder life by sufficiently suppressing the fatigue crack propagation property due to voids, but also to eliminate the occurrence of heat conduction loss due to void and a bladder capable of shortening the vulcanization time by improving the thermal conductivity can be provided. The manufacture of a bladder as above does not need to use an expensive filler having a high thermal conductivity, and it is not necessary to greatly change the technique from the conventional technique, so it can be carried out at low cost.

EXAMPLES

Hereinafter, the present invention will be described in detail with reference to examples.
1. Production of Rubber Composition for Bladder In accordance with the compounding recipe shown in Table 1, each compounded material was charged into a Banbury mixer and kneaded to obtain a rubber composition for a bladder.

The specific compounding materials are as follows. IIR: BUTYL 268 manufactured by Exxon Mobil Chemical Company Ultra high molecular weight component: SLR 6430 (linear high polymer type high styrene SBR, Mw: 2 million) manufactured by Dow Chemical Company
CR: 1066 manufactured by Exxon Chemical Company
Carbon black-1: T-NS carbon black
Carbon black-2: DENKA black manufactured by DENKA Co., Ltd. (acetylene black)
Oil: NC 300 SN (aroma process oil) manufactured by JXTG Nippon Oil & Energy Corporation
Zinc oxide: Zinc oxide No. 1 manufactured by Mitsui Mining & Smelting Co., Ltd.
Phenolic resin: Tackirol 201 (alkyl phenol formaldehyde resin) manufactured by Sumitomo Chemical Co., Ltd.

Next, the obtained rubber composition for a bladder was extruded into a band shape while sucking a gas component by vacuum using an extruder.
2. Manufacture of Bladder Next, the extruded rubber composition was injected toward the bladder mold and vulcanized at 190° C. for 30 minutes to produce a bladder (thickness 7 mm) of 195/65R15 size. At this time of injection of the rubber composition, suction was carried out appropriately by vacuum as shown in Table 1.

In parallel, a vulcanized rubber composition having a size of 100 mm in length×50 mm in width×10 mm in thickness was prepared by vulcanizing the extruded rubber composition at 190° C. for 30 minutes, thus a test piece for measurement of thermal conductivity was prepared (The sample is homogeneous, the measurement surface is smooth).
3. Evaluation Evaluation was made on the following items.
1) Processability By measuring $ML_{1+4}$ (100° C.) for each rubber composition, the processability as an index of fluidity at the time of injection molding was evaluated. The results are shown in Table 1. The smaller the $ML_{1+4}$ number is, the better the workability can be evaluated.
(2) Thermal Conductivity The thermal conductivity (W/m·K) of each test piece was measured in accordance with JIS-R2616 under the conditions of a measurement temperature of 25° C. and a measurement time of 60 seconds using a thermal conductivity measuring instrument (QTM-500 manufactured by Kyoto Electronics Industry Co.) was measured. The results are shown in Table 1. The larger the numerical value, the easier it is to pass heat, and the shorter the vulcanization time can be.
(3) Bladder Life Test Tire molding (vulcanization condition: 185° C., 8 minutes) of 195/65R15 size was repeated using each bladder to check the number of use (vulcanization) until the bladder was punctured. Setting Comparative Example 1 to 100, the index was indicated by the following formula. The results are shown in Table 1. The larger the index is, the longer the life of the bladder is.

(Bladder life index)={(number of times of use of each example)/(number of times of use of comparative example 1)}×100

TABLE 1

| (Pfr) | | Example 1 | Comparative Example 1 | Example 2 | Comparative Example 2 | Comparative Example 3 | Comparative Example 4 |
|---|---|---|---|---|---|---|---|
| Composition | IIR (BUTYL 268) | 88 | 90 | 85 | 70 | 88 | 85 |
| | Ultra high molecular weight component (SLR 6430) | 2 | 0 | 5 | 20 | 2 | 5 |
| | CR (Exxon 1066) | 10 | 10 | 10 | 10 | 10 | 10 |
| | Carbon black-1 (T-NS black) | 25 | 25 | 25 | 25 | 25 | 25 |
| | Carbon black-2 (DENKA black) | 30 | 30 | 30 | 30 | 30 | 30 |
| | Aroma process oil | 5 | 5 | 5 | 5 | 5 | 5 |
| | Zinc oxide | 5 | 5 | 5 | 5 | 5 | 5 |
| | Phenolic resin (Tackirol) | 8 | 8 | 8 | 8 | 8 | 8 |
| Vacuum during injection molding | | Apply | Apply | Apply | Apply | Not apply | Not apply |
| Processability $ML_{1+4}$(100° C.) | | 58 | 57 | 60 | 78 | 59 | 60 |

TABLE 1-continued

| (Pfr) | Example 1 | Comparative Example 1 | Example 2 | Comparative Example 2 | Comparative Example 3 | Comparative Example 4 |
|---|---|---|---|---|---|---|
| Thermal conductivity (W/m·K) | 0.38 | 0.30 | 0.39 | 0.39 | 0.31 | 0.32 |
| Bladder life index | 111 | 100 | 110 | 63 | 101 | 103 |

As shown in Table 1, in Examples 1 and 2, $ML_{1+4}$ was almost the same as Comparative Example 1, while heat conduction and bladder life index were improved. Therefore, thermal conductivity Improvement and improvement of Bladder Life Index, by suppressing bubble growth by strain hardening, were able to be confirmed.

On the other hand, in Comparative Example 2, it is found that $ML_{1+4}$ greatly increases due to addition of an excessive high molecular weight component, resulting in deterioration of fluidity. As a result of this deterioration of fluidity, defects which are regarded as rubber flow defects were observed in a part of the bladder, and it was inferred that the defects were starting points which resulted in early crack injuries which resulted in shortening of bladder life.

Comparative Examples 3 and 4 are examples of the same recipe as in Examples 1 and 2 in which vacuum was not applied during injection molding, and it is understood that thermal conductivity and bladder life index are influenced depending on whether or not the inside of the member is degassed.

Although the present invention has been described based on the embodiments, the present invention is not limited to the above-described embodiments. Various modifications can be made to the above embodiment within the same and equivalent scope as the present invention.

What is claimed is:

1. A rubber composition for a bladder used for manufacturing a bladder for vulcanizing a tire which comprises: 1 to 5 parts by mass of a styrene-butadiene rubber having a weight average molecular weight Mw of 1,000,000 or more blended in 100 parts by mass of a rubber component containing butyl rubber as a main component.

2. The rubber composition according to claim 1, wherein the styrene-butadiene rubber is a high styrene rubber.

3. A method for manufacturing a bladder for vulcanization of tires which comprises:
   extrusion molding a rubber composition for a bladder using an extruder to form an extruded rubber composition,
   followed by injection molding the extruded rubber composition into a bladder mold while performing vacuum suction,
   wherein the rubber composition for a bladder comprises 1 to 5 parts by mass of a styrene-butadiene rubber having a weight average molecular weight Mw of 1,000,000 or more blended with 100 parts by mass of a rubber component containing butyl rubber as a main component.

4. A tire vulcanizing bladder used for vulcanization molding of a pneumatic tire,
   which comprises 1 to 5 parts by mass of a styrene-butadiene rubber having a weight average molecular weight Mw of 1,000,000 or more blended in 100 parts by mass of a rubber component containing butyl rubber as a main component, and
   which has a thermal conductivity of 0.38 W/m·K or more.

5. The tire vulcanizing bladder according to claim 4, wherein the thickness of the bladder is 5 to 15 mm.

6. The tire vulcanizing bladder according to claim 4, wherein the styrene-butadiene rubber is a high styrene rubber.

* * * * *